United States Patent [19]
Abiru et al.

[11] Patent Number: 5,272,847
[45] Date of Patent: Dec. 28, 1993

[54] LONG PERIOD PENDULUM DAMPING EQUIPMENT

[75] Inventors: Hisanori Abiru; Hideaki Harada; Kazumi Tamura; Manabu Fujishiro; Jun Hirai; Yasuo Ogi, all of Hiroshima, Japan

[73] Assignee: Mitsubishi Jukogyo Kabushiki Kaisha, Tokyo, Japan

[21] Appl. No.: 729,464

[22] Filed: Jul. 12, 1991

[30] Foreign Application Priority Data

Aug. 30, 1990 [JP] Japan .................................. 2-228740
Oct. 1, 1990 [JP] Japan .................................. 2-260596

[51] Int. Cl.⁵ .......................... E04B 1/98; E04H 9/02
[52] U.S. Cl. .......................... 52/167 DF; 52/167 R
[58] Field of Search .................... 52/167 DF, 167 R

[56] References Cited

U.S. PATENT DOCUMENTS

| | | | |
|---|---|---|---|
| 1,761,322 | 6/1930 | Wells | 52/167 DF |
| 5,025,599 | 6/1991 | Ishii et al. | 52/167 DF |
| 5,058,338 | 10/1991 | Ciampi | 52/167 DF |

FOREIGN PATENT DOCUMENTS

| | | | |
|---|---|---|---|
| 2283362 | 3/1976 | France . | |
| 135628 | 6/1988 | Japan | 52/167 DF |

*Primary Examiner*—Michael Safavi
*Attorney, Agent, or Firm*—McAulay Fisher Nissen Goldberg & Kiel

[57] ABSTRACT

A long period pendulum damping equipment having right and left pair of longer rods, right and left pair of shorter rods and a tie beam connecting these longer rods and shorter rods one another, in which a tilt angle interlocking means of both rods installed at right and left end portions of the tie beam, respectively, and keeping the tilt angle in one direction of the longer rod with respect to a vertical line always equal to the tilt angle in another direction of the shorter rod or certain ratio times thereof is provided, and a long period is provided and an installation space is made small while making the overall height low by pivoting a weight to either one of the longer or shorter rod.

5 Claims, 4 Drawing Sheets

LONG PERIOD PENDULUM DAMPING EQUIPMENT

FIELD OF THE INVENTION AND RELATED ART STATEMENT

The present invention relates to a long period pendulum damping equipment applied to controlling of oscillation of a long period structure such as a skyscraper.

Among damping equipments applied to long period structures, an equipment having a pendulum structure in which a weight is suspended with a wire and the like having a suspension length l which has an almost equal period to a period of a structure has been known as an equipment which is operable from such a small acceleration that a human being does not feel it.

Now, in such a skyscraper that requires damping countermeasures, a proper period reaches approximately 10 seconds sometimes, thus requiring to set the period of the damping equipment to almost the same. Here, when it is assumed that a pendulum length is l and the gravitational acceleration is g, a period T of the pendulum is given by the following expression.

$$T = 2\pi \sqrt{\frac{l}{g}}$$

In order to obtain a period of approximately 10 seconds, however, a pendulum having a suspension length of approximately 25 m is required from the relationship in above-mentioned expression, thus requiring an extensive space for setting the damping equipment.

OBJECT AND SUMMARY OF THE INVENTION

It is an object of the present invention which has been proposed in view of such circumstances to provide a long period pendulum damping equipment in which the overall height is made as lowest as possible and that a long period is provided and an installation space can be made small.

A first gist of the present invention for achieving above-mentioned object exists in a long period pendulum damping equipment comprising right and left pair of longer rods having an equal length with upper ends pivoted at upper ends thereof to a structure, respectively, at an appropriate interval and extending perpendicularly downward, a tie beam in a horizontal direction with right and left ends pivoted at lower ends of above-mentioned respective longer rods, shorter rods having an equal length extending perpendicularly upward with respective lower ends pivoted at right and left ends of above-mentioned tie beam, tilt angle interlocking means of both rods which are installed at right and left end portions of the tie beam and keep the tilt angle in one direction of above-mentioned longer rods with respect to the vertical line always equal to a tilt angle in another direction of above-mentioned shorter rods or certain ratio times as large as the tilt angle, and a weight having right and left ends pivoted at upper parts of above-mentioned respective shorter rods.

A second gist of the present invention for achieving above-mentioned object exists in a long period pendulum damping equipment comprising right and left pair of shorter rods having an equal length pivoted at lower ends thereof to an objective structure at an appropriate interval, respectively, and extending perpendicularly upward, a tie beam in a horizontal direction pivoted at right and left portions thereof to upper ends of above-mentioned respective shorter rods, longer rods having an equal length pivoted at upper ends thereof to right and left portions of the tie beam, respectively, and extending perpendicularly downward, tilt angle interlocking means of both rods which are installed at the right and left portions of the tie beam, respectively, and keep the tilt angle in one direction of above-mentioned longer rods always equal to a tilt angle in another direction of above-mentioned shorter rods with respect to the vertical line or certain ratio times of the tilt angle, and a weight pivoted at right and left portions thereof to the lower parts of above-mentioned respective longer rods.

According to the construction of the first gist of the present invention, the pendulum presents a V shape at the time of oscillation with a longer rod having the length of $l_1$ and a shorter rod having a length of $l_2$ and, when the mass of gears and tie beam is neglected, the period T is expressed as follows.

$$T = 2\pi \sqrt{\frac{(l_1 + l_2)^2}{g(l_1 - l_2)}}$$

As a result, a long period damping equipment is obtainable in spite of a comparatively low overall height depending on selection of length $l_1$ and $l_2$ of both rods.

According to the construction of the second gist of the present invention, when it is assumed that the lengths of a shorter rod and the length of a longer rod joined together in an inverted V shape through a gear are $l_{11}$ and $l_{12}$, the mass of the gear and the tie beam is $m_{11}$, and the mass of the damping weight is $m_{12}$, the period T of a damping system of the present invention is expressed by following expressions when the mass of above-mentioned gear and tie beam is taken into consideration.

$$f = \frac{1}{2\pi} \sqrt{\frac{g}{l}}$$

$$l = \frac{(l_{11} + l_{12})^2 m_{12} + l_{11}^2 m_{11}}{(l_{12} - l_{11}) m_{12} - l_{11} m_{11}}$$

A long period pendulum is obtainable in spite of a comparatively low overall height depending on selection of $l_{11}$ and $l_{12}$.

DETAILED DESCRIPTION OF PREFERRED EMBODIMENTS (1) First, an embodiment corresponding to above-mentioned first gist of the present invention will be described hereafter with reference to FIG. 1 thru FIG. 4.

Figure 1:
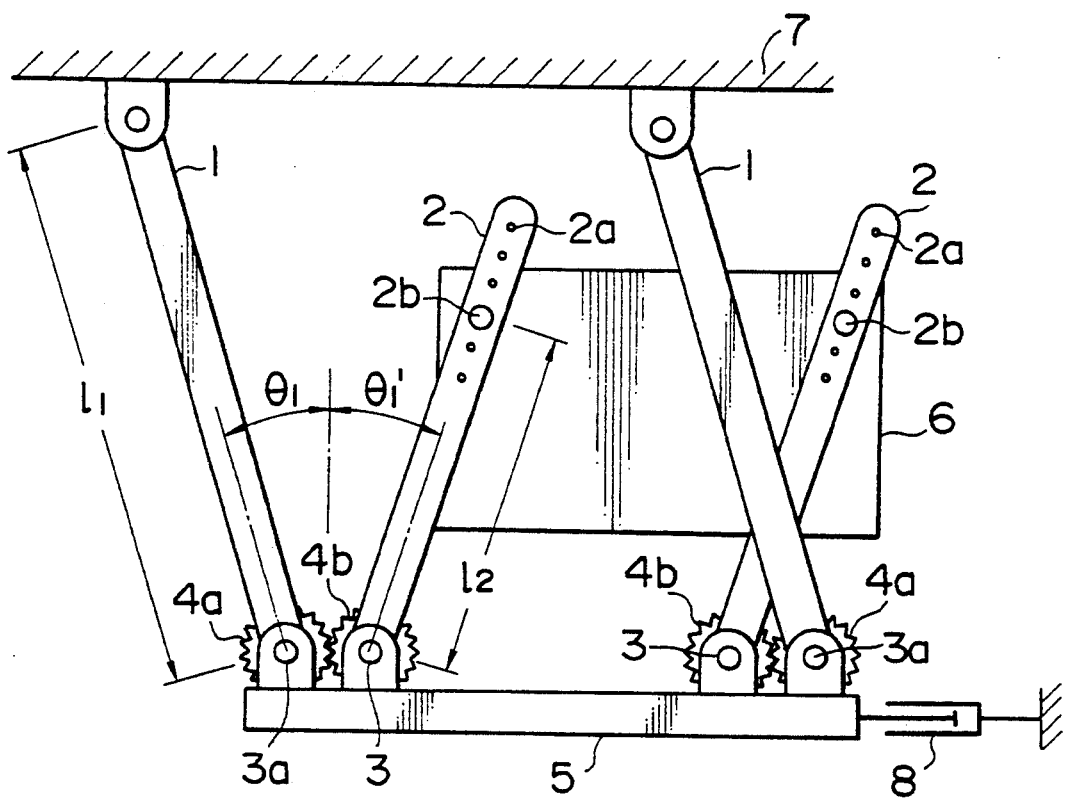
FIG. 1 is a front view showing an embodiment according to the first gist of the present invention.
Figure 2:
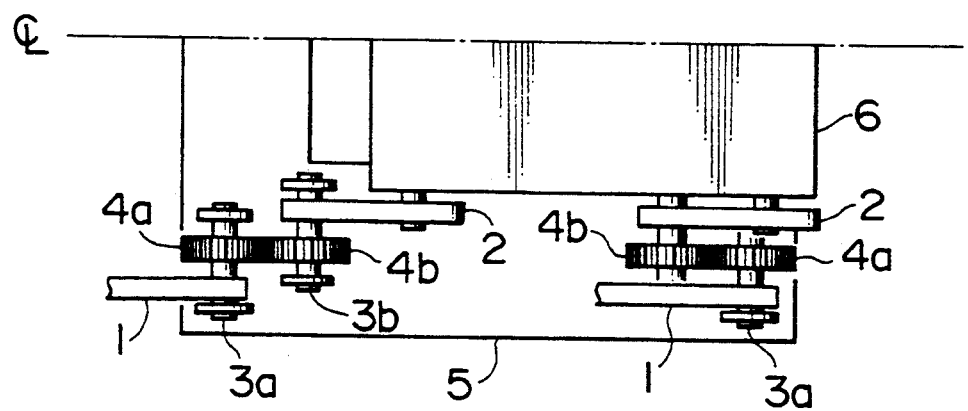
FIG. 2 is a partial plan view of the embodiment shown in FIG. 1.

In FIG. 1 and FIG. 2, 1,1 denote comparatively long right and left pair of longer rods having a length of $l_1$ with upper ends hereof pivoted respectively to an objective structure 7 at an appropriate interval and hung down perpendicularly, and lower ends of respective longer rods 1 are pivoted at right and left ends of a tie beam 5 which is comparatively light in weight by means of pins 3a, respectively.

2,2 denote comparatively short pair of shorter rods having a length of $l_2$ which are pivoted at respective lower ends thereof in the vicinity of pivot pins 3a, 3a at lower ends of the longer rods at right and left ends of the tie beam 5 by means of pins 3b, 3b and in which upper ends thereof extend upward, 4a and 4b denote a pair of gears having the same size installed at the lower ends of the longer rod 1 and the shorter rod 2, which act to interlock both rods in a V shape so as to make a left tilt angle $\theta_1$ and a right tilt angle $\theta_1'$ of the longer rod 1 and the shorter rod 2 with respect to the vertical line equal to each other by engaging these gears with each other. 6 denotes a weight pivoted to a plurality of pin holes 2a bored at upper parts of the shorter rods 2, 2 by pins 2b at right and left ends thereof, and 8 denotes an attenuator installed between the tie beam 5 and the objective structure 7.

In the above equipment, if the shorter rod 2 is tilted toward one side by the tilt angle $\theta_1$ with respect to the vertical line when the weight 6 moves horizontally, the longer rod 1 is also tilted toward another side by the same tilt angle $\theta_1$ through the gears 4a and 4b.

Thus, a horizontal displacement $\delta$ of the weight 2 is expressed by an expression (1) within a range where $\theta_1$ is comparatively small.

$$\delta = (l_1 + l_2)\sin \theta_1 \div (l_1 + l_2)\theta_1 \quad (1)$$

Here, a vertical movement $\Delta h$ of the weight 6 is expressed by the expression (2).

$$\Delta h = (l_1 - l_2)(1 - \cos \theta_1) \quad (2)$$
$$\approx (l_1 - l_2)\frac{\theta_1^2}{2}$$

Thus, the potential energy U when the weight has moved to a position shown in the figure is obtained by an expression (3) in case the weight of the gears 4a and 4b and the tie beam 5 is neglected and the mass of the weight is at m.

$$U = mg\Delta h = mg\frac{l_1 - l_2}{(l_1 + l_2)^2} \cdot \frac{\delta^2}{2} \quad (3)$$
$$= K \cdot \frac{\delta^2}{2}$$

The spring constant K is given by an expression (4).

$$K = mg\frac{l_1 - l_2}{(l_1 + l_2)^2} \quad (4)$$

Thus, the period T is given by an expression (5).

$$T = 2\pi \sqrt{\frac{(l_1 + l_2)^2}{g(l_1 - l_2)}} \quad (5)$$

Here, when it is assumed that $l_1$ is 2 m and $l_2$ is 1.5 m, the period T becomes approximately 10 seconds. Thus, it becomes possible to obtain a long period at the suspension height of 2 m, and it is also possible to obtain a long period at a low suspension height according to the present equipment.

Besides, the period T is adjustable by supporting the weight 6 while changing the length of the effective length $l_2$ of the shorter rod 2.

Further, it is possible to provide a passive damping equipment with an attenuator having a short stroke by setting an attenuator 8 to the tie beam 5.

In above-mentioned embodiment, the gears 3a and 3b which have the longer rod 1 and the shorter rod 2 engage with each other have the same size, but it is possible to make the overall height lower and obtain a desired oscillation frequency of a long period by adopting gears having a desired gear ratio for the gears 3a and 3b and making the tilt angle of the shorter rod 2 gear ratio times as large as that of the longer rod 1.

Figure 3:
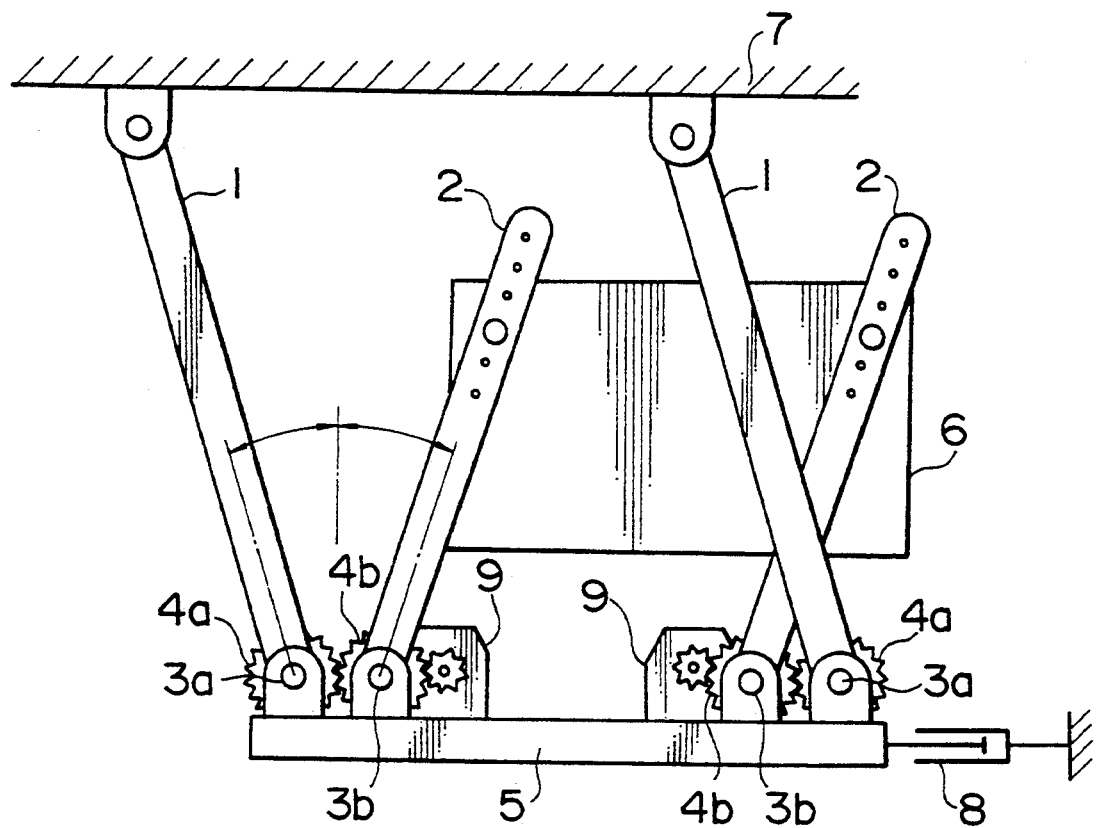
FIG. 3 is a side view showing an activated example of the embodiment in FIG. 1.
Figure 4:
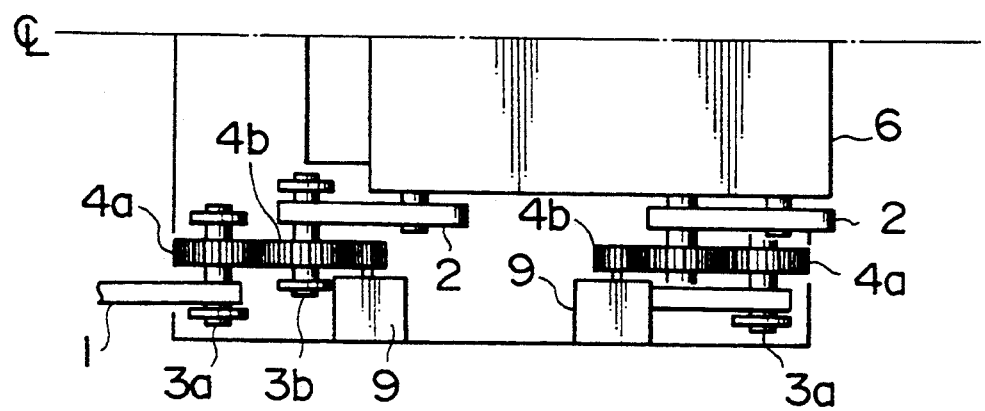
FIG. 4 is a partial plan view of the activated example shown in FIG. 3.

Incidentally, above-mentioned embodiment can also be formed in an active damping equipment by driving the gears 4b with servomotors 9 as shown in FIG. 3 and FIG. 4, respectively.

According to the above mentioned embodiment, the following effects are taken.

① It is possible to obtain a long period damping equipment at a low suspension height.

② Further, a compact active damping equipment having no sliding portion is obtainable by driving gears with servomotors and the like.

(2) In the next place, an embodiment corresponding to above-mentioned second gist of the present invention will be described hereafter with reference to FIG. 5 thru FIG. 8.

Figure 5:
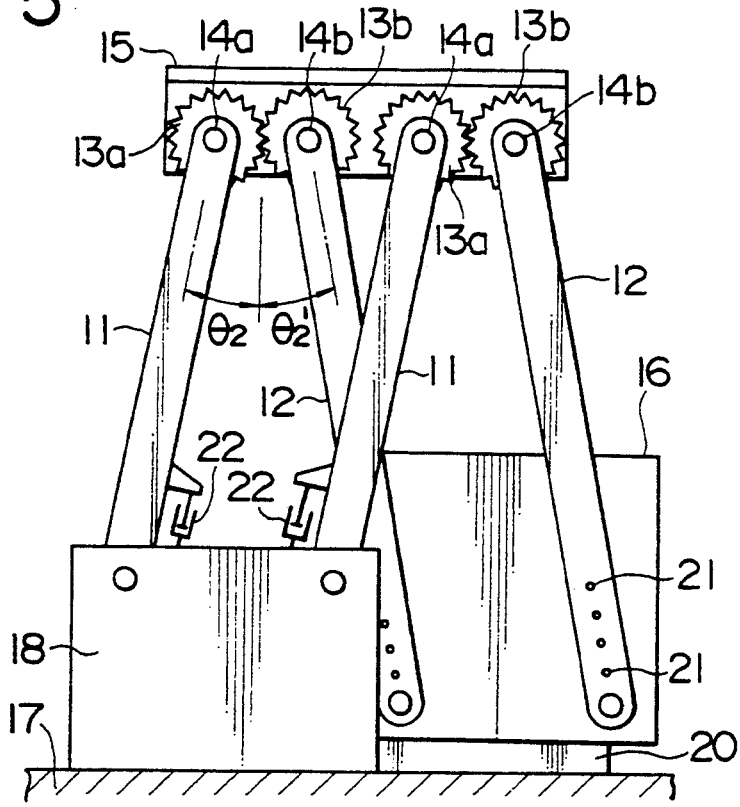
FIG. 5 is a side view showing an embodiment according to the second gist of the present invention.
Figure 6:
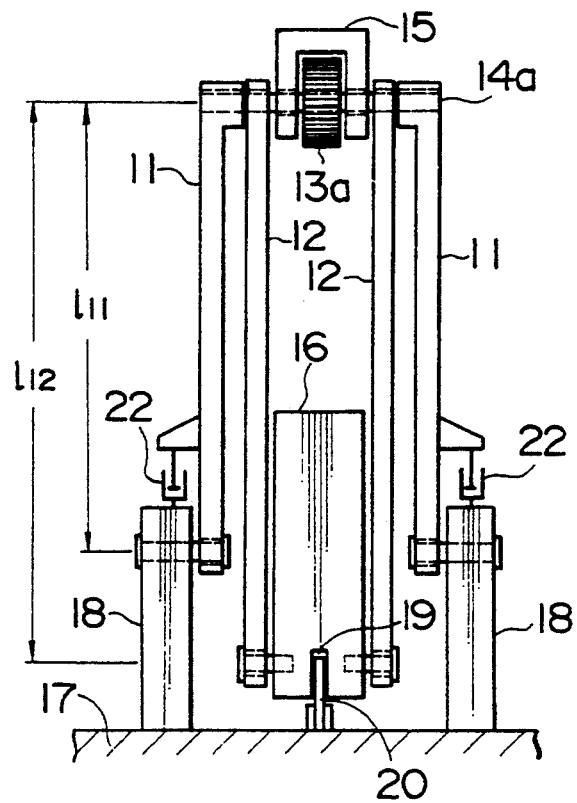
FIG. 6 is a front view of the embodiment shown in FIG. 5.

In FIG. 5 and FIG. 6, 11, 11 denote right and left pair of shorter rods having relatively short length $l_{11}$ which are pivoted at low ends thereof at an appropriate interval, respectively, on a support base 18 fixed to an objective structure 17 and extend upward, and upper ends of respective shorter rods 11 are pivoted at right and left portions of a tie beam 15 which is comparatively light in weight and has large rigidity by means of connecting pins 14a, respectively.

12, 12 denote comparatively long right and left pair of longer rods having a length of $l_2$ which are pivoted at upper ends thereof in the vicinity of connecting pins 14a, 14a at upper ends of the shorter rods 11 at right and left portions of the tie beam 15 by means of pins 14b, 14b and extend downward, and 13a and 13b denote a pair of gears having the same size provided at upper ends of the shorter rod 11 and the longer rods 12, which act to interlock both rods in an inverted V shape so as to make a left tilt angle $\theta_2$ and a right tilt angle $\theta_2'$ of the shorter rod 11 and the longer rod 12 with respect to the vertical line equal to each other by having these gears engage with each other.

16 denotes a weight pivoted by support pins 21 to a plurality of pin holes bored at an equal interval at lower parts of the longer rods 2, 2 at right and left ends thereof, and 19 denotes a longitudinal groove recessed along a center line in an oscillating direction of the bottom surface of the weight 16, and an upper part of a guide rail 20 bored in a longitudinal direction on a floor surface of a structure is inserted loosely into the longitudinal groove 19.

When the objective structure oscillates longitudinally and weight 16 moves horizontally in the above structure, the shorter rod 11 is tilted by $\theta_2$ in one direction, and the longer rods 12, 12 are tilted by the same angle $\theta_2$ in another direction by the action of the gears 13a and 13b at the same time.

Thereupon, synchronous adjustment of the weight becomes possible with the length $l_{12}$ variable for the reason described hereunder by having selected the position of the support pin 21 in advance.

Namely, when it is assumed that the mass of the gears 13a and 13b and the tie beam 15 is $m_{11}$ and the mass of weight 16 is $m_{12}$, the proper oscillation frequency f of the weight 6 is derived as follows.

A horizontal displacement $\delta_1$ of the gear 13 and the tie beam 15 and a horizontal displacement $\delta_2$ of the weight 16 are obtained as expressed by following expressions (6) and (7) within a range in which $\theta_2$ in FIG. 5 is comparatively small.

$$\delta_1 = l_{11} \sin\theta_2 \approx l_{11} \theta_2 \tag{6}$$

$$\delta_2 = (l_{11} + l_{12})\sin\theta_2 \approx (l_{11} + l_{12}) \theta_2 \tag{7}$$

Further, when it is assumed that a vertical movement (upward direction is positive) of the gear 13 and the tie beam 15 is $\Delta h_1$ and a vertical movement (upward direction is positive) of the weight 16 is $\Delta h_2$, $\Delta H_1$ and $\Delta h_2$ are expressed by the following expressions (8) and (9), respectively.

$$\Delta h_1 = -l_{11}(1 - \cos\theta_2) \approx -l_1 \frac{\theta_2^2}{2} \tag{8}$$

$$\Delta h_2 = (l_{12} - l_{11})(1 - \cos\theta_2) \approx (l_{12} - l_{22}) \frac{\theta_2^2}{2} \tag{9}$$

The potential energy U is expressed by the following expression.

$$U = m_{12}g\Delta h_2 + m_{11}g\Delta h_1 \tag{10}$$

$$= \{m_{12}g(l_{12} - l_{11}) - m_{11}g l_{11}\}\frac{\theta_2^2}{2}$$

$$= \frac{\{m_{12}g(l_{12} - l_{11}) - m_{11}g l_{11}\}}{(l_{11} + l_{12})^2} \cdot \frac{\delta_2^2}{2}$$

$$= K \cdot \frac{\delta_2^2}{2}$$

In the expression (10), K is a spring constant, which is expressed by the following expression.

$$K = \frac{m_{12}g(l_{12} - l_{11}) - m_{11}g l_{11}}{(l_{11} + l_{12})^2} \tag{11}$$

Further, an equivalent mass (generalized mass) m* at this time is expressed by the following expression.

$$m^* = m_{12} + m_{11}\left(\frac{\delta_1}{\delta_2}\right)^2 = m_{12} + m_{11}\left(\frac{l_{11}}{l_{11} + l_{12}}\right)^2 \tag{12}$$

$$= \frac{m_{12}(l_{11} + l_{12})^2 + m_{11}l_{11}^2}{(l_{11} + l_{12})^2}$$

Accordingly, the oscillation frequency f is given by the following expression from the expressions (11) and (12).

$$f = \frac{1}{2\pi}\sqrt{\frac{K}{m^*}} \tag{13}$$

$$= \frac{1}{2\pi}\sqrt{\frac{m_{12}g(l_{12} - l_{11}) - m_{11}g l_{11}}{m_{12}(l_{11} + l_{12})^2 + m_{11}l_{11}^2} \cdot g}$$

$$= \frac{1}{2\pi}\sqrt{\frac{g}{\bar{l}}}$$

In the expression (13), $\bar{l}$ is an equivalent pendulum length, which is expressed by the expression (14).

$$l = \frac{m_{12}(l_{11} + l_{12}) + m_{11}l_{11}^2}{m_{12}(l_{12} - l_{11}) - m_{11}l_{11}} \tag{14}$$

In order that the expression (14) is formularized, however, it is important to satisfy the following conditions for the purpose of stabilizing the system.

$$m_{12}(l_{12} - l_{11}) - m_{11}l_{11} > 0 \tag{15}$$

$$\therefore \frac{m_{12}}{m_{11}} > \frac{l_{11}}{l_{12} - l_{11}}$$

Since the equivalent pendulum length $\bar{l}$ is set with above-mentioned expression (14), it is possible to make the period of the weight pendulum longer with inverted V-shaped rods having a comparatively low height.

Besides, it is possible to provide a passive damping equipment in spite of an attenuator having a comparatively short stroke by installing an attenuator 22 between the shorter rod 11 and the support base 18.

Presumably, when it is assumed that $l_{11} = 1.5$ m; $l_{12} = 2.5$ m; $m_{12} \doteq 5 m_{11}$, an inverted V-shaped pendulum having a period of approximately 10 seconds is materialized.

In above-mentioned embodiment, the gears 13a and 13b having the same size which have the shorter rod 11 and the longer rod 12 engage with each other have been adopted, but it is possible to make the overall height lower and obtain the oscillation frequency of a desired long period by adopting gears having a desired gear ratio and making the tilt angle of the longer rod 12 gear ratio times as large as that of the shorter rod 11.

Figure 7:
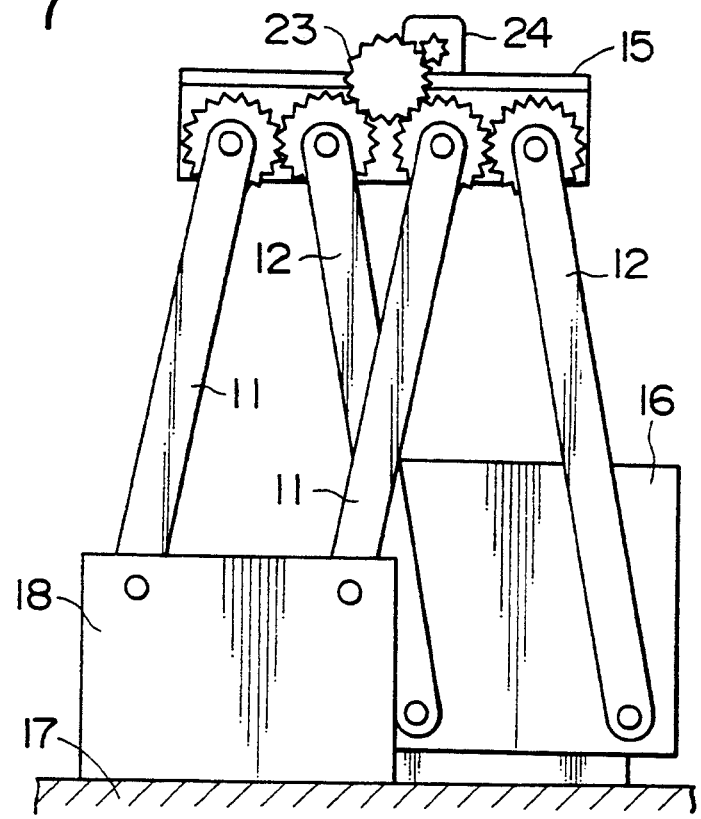
FIG. 7 is a side view showing an activated example of the embodiment in FIG. 5.
Figure 8:
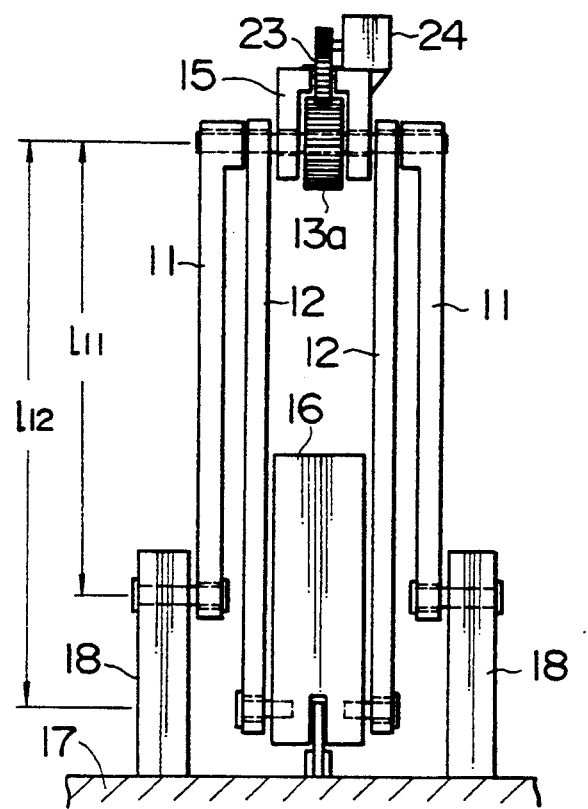
FIG. 8 is a front view of the activated example of the embodiment shown in FIG. 7.

Furthermore, it is also possible to provide an active damping equipment by modifying the structure of above-mentioned embodiment to some extent so as to drive the shorter rod and the longer rod with a servomotor 24 through a reduction gear 23 as shown in FIG. 7 and FIG. 8.

According to the above embodiment and the modification example, the following effects are obtained.

① It is possible to obtain a damping equipment having a long period at a low suspension height, and an extensive space is not required for installation.

② A frame and the like for suspending a damping equipment are no longer required.

③ It is possible to obtain a compact active damping equipment having no sliding part by driving the gear portion with a servomotor and the like.

(3) According to the present invention, a long period pendulum damping equipment in which the overall height is made as lowest as possible and that a long period is provided and it is possible to make the installation space small is provided. Hence, the present invention is very useful in the industrial field.

Incidentally, as a driving unit in an active damping equipment, there are a unit having such a structure that a force is applied directly to the weight portion or the connecting beam portion by means of a servomotor and a ball screw installed in the objective structure in place of a structure in which rods are driven by means of a servomotor as described above, or a unit having such a structure that a slit is provided on the weight in parallel with the oscillation surface and a plate disposed with a linear motor is inserted into the slit portion for driving and so on.

We claim:

1. A long period pendulum damping device comprising:

right and left first rods, each having a first and a second end and each having a first length, the first rods each being pivotally connected at the second ends to a structure, the first rods forming a first tilt angle with a vertical axis;

a horizontal tie beam having right and left ends pivotally connected to the first ends;

right and left second rods, having a second length and respective third ends pivotally connected to the right and left ends, the second rods forming a second tilt angle with the vertical axis;

tilt angle interlocking means in the form of gears installed at the right and left ends of the tie beam for pivotally locking each of the first rods to respective ones of the second rods at the tie beam so that a change in one of the first tilt angle and the second tilt angle results in a corresponding change in the other of the first tilt angle and the second tilt angle so as to keep the first tilt angle in constant proportion to the second tilt angle; and a weight having right and left edges, the second rods having fourth ends opposite the third ends, the fourth ends being pivotally connected to the right and the left edges.

2. The long period pendulum damping device according to claim 1 wherein the first length is longer than the second length.

3. The long period pendulum damping device according to claim 1 wherein the first length is shorter than the second length.

4. A long period pendulum damping device according to claim 2, characterized in that there is provided a drive unit which accelerates swinging of the weight.

5. The long period pendulum damping device according to claim 3 characterized in that there is provided a drive unit which accelerates swinging of the weight.

* * * * *